Jan. 30, 1923.
J. J. CURRAN.
AIRPLANE.
FILED OCT. 10, 1919.
1,443,812.
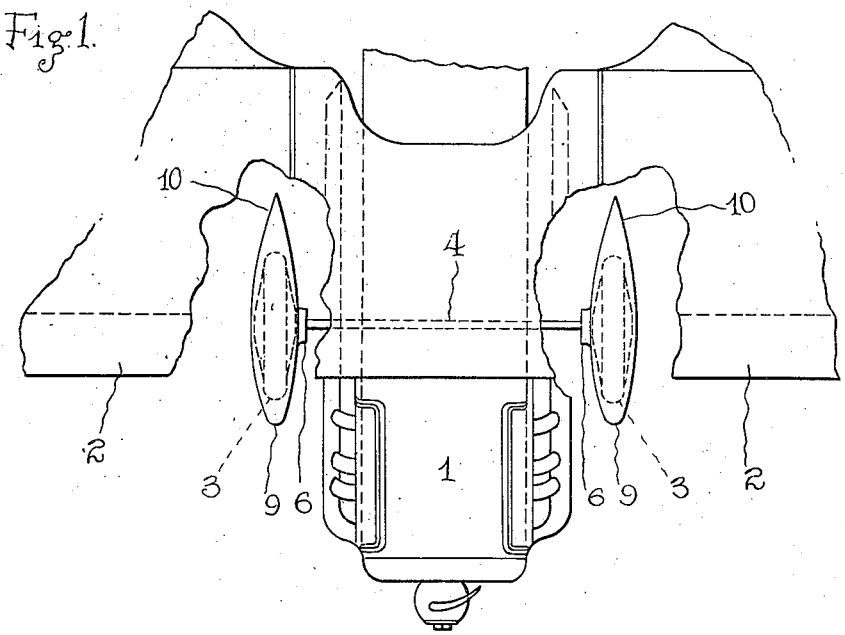
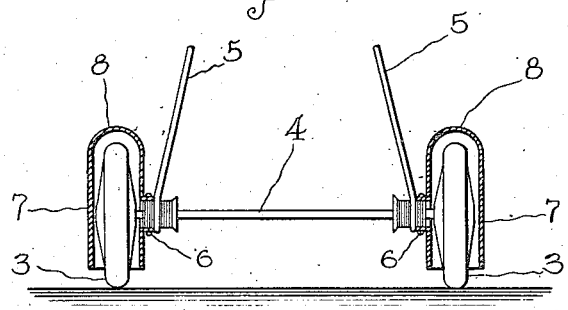
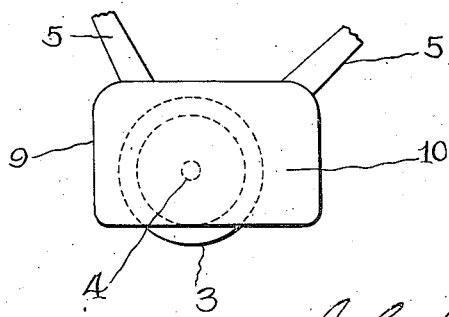

Patented Jan. 30, 1923.

1,443,812

UNITED STATES PATENT OFFICE.

JOHN J. CURRAN, OF LONG ISLAND CITY, NEW YORK, ASSIGNOR OF ONE-HALF TO FREDERICK W. BARKER, OF GREAT KILLS, NEW YORK.

AIRPLANE.

Application filed October 10, 1919. Serial No. 329,775.

*To all whom it may concern:*

Be it known that I, JOHN J. CURRAN, a subject of King George V, and resident of Long Island City, in the county of Queens and State of New York, have invented certain new and useful Improvements in Airplanes, of which the following is a specification.

This invention relates to airplanes and my improvement is particularly directed to means for stream-lining the traction wheels of an airplane, to minimize the speed retarding effects of head resistance thereof when the machine is in flight.

With this object in view my invention consists of a covering for the upper portion of each wheel, said covering extending downwardly over the wheel to a point below which clearance must be left for wheel tractive purposes, and said covering having such air entering and leaving contours as are adapted to create the least resistance in the atmosphere penetrated by this part of the machine while flying.

Other features and advantages of my invention will hereinafter appear.

In the drawing:—

Figure 1 is a partial plan view of an airplane whose traction wheels are provided with my invention.

Fig. 2 is a front elevation partly in section of my improvement, and

Fig. 3 is a side elevation of Fig. 2.

In the example of my invention illustrated herewith, let 1 indicate the body or fuselage of an airplane, 2 the supporting surfaces, and 3 the traction wheels, mounted on axle 4, that is connected with the fuselage as by struts 5.

Attached to the ends or hubs of axle 4, as by a flange 6, is a cover member for each wheel, said cover member comprising a casing composed of sheet metal or other suitable material, and having the side walls 7, upper connecting portion 8, forward rounded portion 9, which presents a somewhat blunt entering edge, and stream-lined rear portion 10. The said cover member encloses the wheel at its upper portion and sides down to a point where a sufficient vertical extent of the wheel remains uncovered to permit the wheel tread to have tractive effect, and to leave an ample clearance between the base line of the wheel and the lower edges of the cover member for avoiding obstructions which may be met on the surface of the ground over which the airplane travels in its run for taking off and upon landing. The extent of this clearance will be determined to suit the conditions of usage.

With the means described for overcoming the head resistance of airplane wheels some increase in speed of flight will be available, my experience proving that the drag now presented by airplane wheels with a machine in flight is appreciable and constitutes a factor of contributory importance in the total amount of head resistance presented by an airplane.

I do not wish to limit myself to the particular design of the stream-lined wheel cover herein shown, but desire rather to cover broadly the use of a stream-lined covering for airplane traction wheels.

I claim:

The combination with an airplane having traction wheels and an axle therefor, of flanges carried by the axle at its respective ends, and stream-lined wheel enclosures carried by said flanges, said enclosures extending over the upper, forward and rear portions of the wheels, leaving only the lower portions of the wheels exposed for surface-contacting purposes.

Signed at Long Island City, in the county of Queens and State of New York this 6th day of October A. D. 1919.

JOHN J. CURRAN.